United States Patent [19]

Warren

[11] 4,290,510
[45] Sep. 22, 1981

[54] WEAR RESISTANT COATED ARTICLE

[75] Inventor: Richard J. Warren, Howell, Mich.

[73] Assignee: Chrysler Corporation, Highland Park, Mich.

[21] Appl. No.: 969,640

[22] Filed: Dec. 14, 1978

[51] Int. Cl.³ ............................ F16D 65/10; B22F 7/02
[52] U.S. Cl. ........................ 188/218 XL; 192/107 M; 428/564
[58] Field of Search ............... 428/564; 192/107 M; 188/218 XL

[56] References Cited

U.S. PATENT DOCUMENTS

| | | | |
|---|---|---|---|
| 2,349,825 | 5/1944 | Kelleher | 428/564 |
| 2,626,457 | 1/1953 | Lieberman | 428/564 X |
| 3,037,860 | 6/1962 | Masterson et al. | 428/564 X |
| 3,403,760 | 10/1968 | Caskey | 188/218 XL |
| 3,703,224 | 11/1972 | Bray | 428/564 X |
| 3,791,493 | 2/1974 | Yamaguchi et al. | 192/107 M X |
| 3,848,313 | 11/1974 | Guyonnet | 428/564 X |
| 4,180,622 | 12/1979 | Burkhard et al. | 428/564 |

*Primary Examiner*—Richard D. Lovering
*Attorney, Agent, or Firm*—Newtson & Dundas

[57] ABSTRACT

A brake rotor with a ceramic-metallic coating. The ceramic-metallic coating provides a wear resistant surface. The coating generally comprises about 30 to 70% by weight of ceramic particles in about 30 to 70% by weight metallic carrier material compatible with the substrate and carbide.

5 Claims, 1 Drawing Figure

U.S. Patent     Sep. 22, 1981     4,290,510
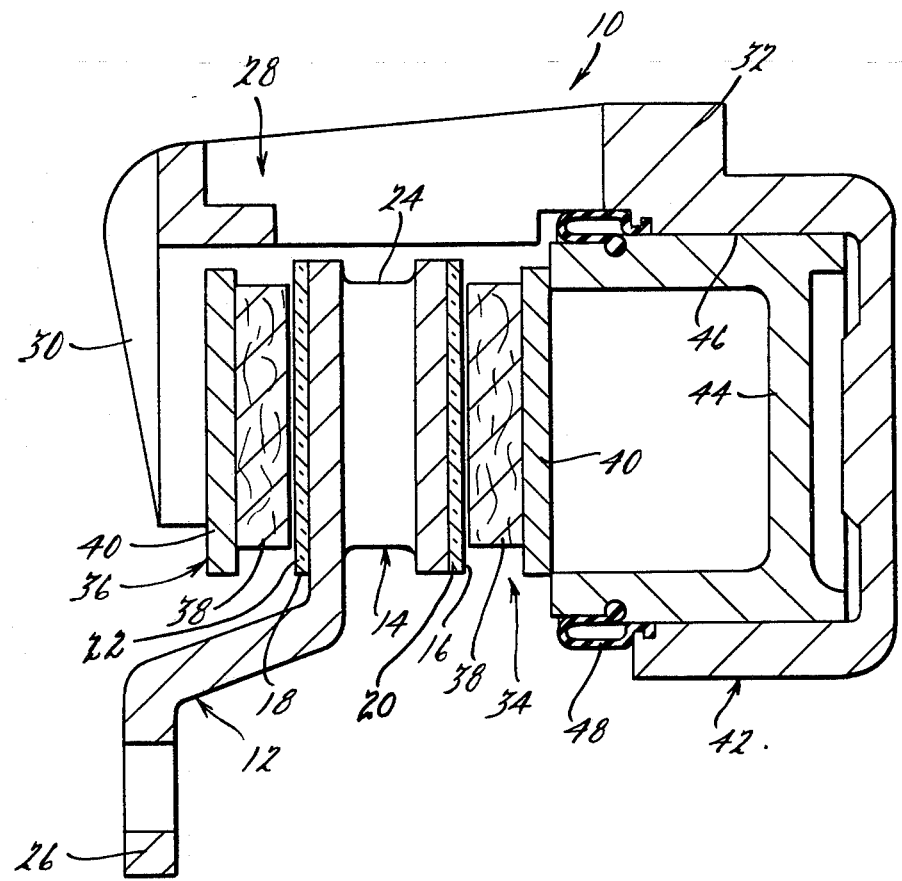

WEAR RESISTANT COATED ARTICLE

BACKGROUND OF THE INVENTION

1. Field of the Invention

In one aspect, this invention relates to brake rotors suitable for use in caliper disk brake assemblies. In a further aspect, this invention relates to coated aluminum articles.

2. Prior Art

It is known to coat metal substrates with hard wear resistant materials for use in machining or wear applications. A common coating material is the cemented carbide coating or laminate on the faces of cutting tools. Cutting tool carbides normally comprise a high percentage on the order of 90% or more hard metal carbide in a matrix of binder metallic material generally chosen from the class of iron, nickel, and/or cobalt alloys. The amount of metallic material in this type of carbide is deliberately minimized, since the metal matrix is used essentially to hold the carbide particles in place, and the metal is considerably weaker and less wear resistant material than the carbide.

In the effort to decrease the weight in passenger vehicles, replacing a cast iron brake rotor with a similar sized rotor formed from aluminum or other light weight metal would save considerable weight. However, light metal rotors by themselves do not have sufficient abrasion resistance to perform satisfactorily in friction applications thereby necessitating a wear resistant coating. A wear resistant coating would also promote brake pad-rotor friction couple compatability to provide improved brake life and stopping characteristics.

SUMMARY OF THE INVENTION

Briefly, the article of this invention is a metallic substrate coated with a wear resistant material on a friction surface. The coating comprises approximately 30 to 70 weight percent ceramic particles in 30 to 70 weight percent metal matrix. The coating can be applied by spraying a powdered mixture onto the metallic substrate to be coated using conventional flame spray techniques.

In particular, the carbide-metal coating can be applied to an aluminum brake rotor on the wear surfaces to provide an aluminum rotor which can be used with iron filled brake linings. The coating can also be applied to other friction surfaces, clutch plates and the like.

BRIEF DESCRIPTION OF THE DRAWINGS

In the accompanying drawings, the FIGURE shows the peripheral area of an aluminum disc brake rotor having a wear coating according to this invention applied to the wear surface.

DESCRIPTION OF THE PREFERRED EMBODIMENT

Referring to the accompanying drawing which shows one application of the wear coating of this invention, a caliper disc brake 10 embodies a rotor 12 made according to this invention. The rotor 12 has a head 14 with a pair of brake shoe engaging faces 16, 18 formed thereon. The faces 16, 18 have been coated with a thin layer 20, 22 of a ceramic metallic material according to this invention as described in greater detail hereinafter. The engaging faces 16, 18 are connected together by a plurality of webs 24 having radially extending spaces therebetween. The webs 24 hold the engaging faces parallel and the spaces therebetween allow the flow of cooling air between the webs to promote cooling of the rotor.

The rotor head 14 is attached to and carried by a mounting flange 26, which is in turn mounted so as to rotate the rotor with an associated wheel, in a well known manner.

A C-shaped caliper 28 is disposed with legs 30, 32 in a spaced parallel opposing relationship to the rotor's engaging faces 16, 18. Brake shoes 34, 36, comprising a brake lining 38 secured to a backing plate 40, are slideably mounted on the caliper 28 for axial movement in a direction generally perpendicular to the disc's plane of rotation.

A fluid motor 42 is carried by the caliper leg 32 and includes a piston 44 slideably disposed within a cylinder bore 46 contained in leg 32. A flexible boot or seal 48 has one end fixed to the caliper and the other end fixed to the piston. The boot 48 prevents dirt and other contaminants from entering the bore 46.

Upon actuation of the fluid motor, the piston 44 moves towards the rotor 12. As the brake pad 38 contacts the rotor's engaging face 16, the reaction force pushes the caliper away from the rotor bringing the pad 36 into frictional engagement with the face 18. The coating on the rotor of this invention is of such a nature that the normal metallic filled organic brake pads commonly known as semi-metallic can be used in direct contact with the coating on the rotor of this invention.

The rotor of this invention is formed from a light metal or metal alloy such as aluminum. Of the light metals, aluminum is a preferred material because of its light weight, good physical properties and abundance. The rotor alloy chosen should be one which retains its strength at the rotor temperatures normally encountered during repeated hard brake usage. On example of a test which the rotor should survive is standard MVSS 105 (75) promulgated by the U.S. Department of Transportation which requires 15 high speed stops over a very short interval. Of course the rotor design and cooling air flow play a role in which material would be acceptable since these factors affect the maximum temperature which the rotor attains. Suitable aluminum alloys include the 224 series, which are aluminum-copper casting alloys commonly available from "Alcoa". A preferred alloy of the 224 series is available under the designation 224-T7. The 224-T7 alloy maintains a high yield strength of about 8000 psi at 400° C. and has a nominal composition of 5% Cu, 0.5% Mn, 0.10 Nb, 0.17 Zr and the balance aluminum.

A second class of aluminum alloys which provides acceptable alloys is the 39X series when modified with nickel. One example is 392 modified with 4% nickel and having a nominal composition of: 19% Si; 0.6% Cu; 1% Mg; 0.4% Mn; 1.5% Fe, 4% Ni and the balance aluminum. These hypereutetic alloys provide good casting alloys which have good high temperature strength, yet are readily available and economically priced.

The rotor of this invention is coated with a ceramic-metallic wear surface. The ceramic portion of the composition comprises approximately 30 to 70% by volume of ceramic particles. Materials containing less than approximately 30% ceramic particles have markedly decreased wear resistance and as such do not provide a suitable long lived rotor. More than 70% ceramic particles results in a material subject to cracking and spalling. A preferred range of ceramic particles is 50 to 60% by volume ceramic material. Materials having 50 to 60% by volume ceramic have the best combination of wear resistance and non-spalling characteristics.

The ceramic particles used in the coating of this invention can be chosen from among the many ceramic materials known in the art. Some examples are the metal carbides, i.e., chromium carbide, tungsten carbide, molybdenum carbide, silicon carbide; the nitrides, i.e., silicon nitride, boron nitride; and the oxides, i.e., aluminates, Zirconia. The preferred ceramics are the metal carbides and metal nitrides which are stable materials not readily fluxed by metals or metal oxides, such as iron or ferrous oxide. Also, the metal carbides have the best heat transfer characteristics of the ceramic materials which aids in dissipating heat from the coating to the rotor, thereby helping to maintain the rotor's temperature uniform.

The ceramic particles will generally have a particle diameter of about 5–200 microns, particles in this size range being amenable to various coating techniques useful for putting the coating on a brake rotor. Preferably, the particles will have a size distribution of 30 to 40 microns. Such a size distribution provides a material with uniform flow characteristics making processing easier.

Broadly, the binder metals and alloys useful with the ceramic materials of this invention are metal alloys which would be compatible with both the ceramic particles and the underlying substrate. In general, the binder metals would be chosen for their ability to bond to the rotor substrate. If the rotor were aluminum, then the alloy would preferably contain a metal which reacts with aluminum, i.e., iron, nickel or copper. It is also desirable that the alloy have a good conductivity to aid in transferring the heat generated upon braking to the rotor to avoid excessive heat build-up on the engaging faces. Further, it would be desirable to have a binder material with a coefficient of expansion which matches that of the rotor. Since this is a practical improbability, it is desirable to match the coefficient as closely as possible and use a material with some ductility to minimize the results of differential expansion. For example, when an aluminum rotor is to be coated, the binding metal could be a nickel-chrome-aluminum alloy.

The coating of this invention can be applied to an aluminum rotor or other metallic substrate by various means known in the art. One particularly useful method of coating is plasma spraying wherein powdered material is fed into a stream of plasma gas and then thrown by the gas against the metallic substrate. Such a process provides an evenly dispersed coating which can be easily applied to the exterior surface of metal substrate.

EXAMPLE

A solid aluminum rotor having a configuration shown in FIG. 1 having a head approximately 1.25 inches thick and an external diameter of about 11 inches was machined from a block of commercially available aluminum alloy 6061-T651. The rotor was left solid and not machined with the radially extending ventilation spaces found in most cast rotors.

The machined rotor was metal coated with a nickel based alloy having a nominal composition of 76% Ni; 19% Cr and 5% Al by weight to a thickness of about 0.14 mm. The coating was applied using a Plasmadyne SG-1B plasma spray gun. The gun was operated at 30 V and 500 amperes. About 30 liters per minute of argon gas was used to form the plasma in the arc gas. The metal alloy in powder form having particles ranging in size from 45–120 microns was fed to the gun at a rate 1.5 kg/hr in an argon feed gas flowing at 14 L/minute. The gun to workpiece distance was maintained at about 7.5 cm.

The rotor was then coated using a ceramic-metallic powder comprising 50% by weight chrome carbide and 50% by weight of the binder metal alloy detailed above using the same operating parameters as the metal coating except the gun was operated at 700 amperes. The cer-met coating was applied to a depth of 0.4 millimeters.

After the coating was deposited, it was ground to a 0.4 micron finish using a green silicon carbide wheel.

The ground and finished aluminum rotor was placed in a dynamometer fixture and subjected to a ten stop test cycle using the first fade series of the 105 M VSS (75) brake standard test and normal organic brake shoes. Near the end of the tenth stop, the test was terminated because the rotor was approaching a temperature of 450° C., a temperature at which failure could be expected to occur on further braking.

The rotor was examined visually. Some small cracks were noted due to thermal expansion; however, the coating still adhered to the substrate and no spalling or galling had occurred. This shows a superior coating which adheres tightly to the underlying substrate, even when the substrate is heated almost to its yielding point.

The brake rotor was reinstalled on the dynamometer and additional spaced stops run to provide a total of 400 stops on the rotor. A corresponding production rotor made of gray cast iron was also tested using the same test technique and brake pad composition for 400 stops.

The wear path was measured using a tallysurf 10 profilometer. The coated aluminum rotor had experienced 0.0025 mm wear and the coast iron 0.0075 mm wear. The ratio of three shows that the coated rotor of this invention provides a long wearing rotor surface.

Various modifications and alterations of this invention will become obvious to those skilled in the art without departing from the scope and spirit of this invention and it is to be understood that this invention is not limited to the illustrative embodiments set forth hereinbefore. As one example of a further embodiment, the coating set forth hereinbefore could be used on clutch plates.

What is claimed is:

1. A brake motor adapted to be used with a caliper braking means comprising:
    a body portion adapted to be attached to a wheel of a vehicle and rotate therewith;
    a head portion attached to said body, said head having friction surfaces thereon, said friction surfaces positioned so as to allow engagement of said surfaces by brake pads located on and actuated by said caliper, said friction surfaces being coated with a wear resistant material including about 30 to 70 percent by volume of a ceramic particulate material selected from the group consisting of metal carbides and metal nitrides and about 30 to 70 percent by volume of a binder metal compatible with the ceramic particles and the rotor wherein said metal is an alloy of a base metal selected from the group consisting of iron, nickel and copper.

2. The rotor of claim 1 wherein said rotor is formed from a cast aluminum alloy.

3. The rotor of claim 1 wherein said metal carbides are selected from the group consisting of chromium carbide, tungsten carbide, molybdenum carbide and silicon carbide, and wherein said metal nitrides are selected from the group consisting of silicon nitride and boron nitride.

4. The rotor of claim 3 wherein said binder metal is a nickel based alloy containing from about 60-80 weight percent nickel.

5. A brake rotor adapted to be used with a caliper braking means comprising:
- a body portion adapted to be attached to a wheel of a vehicle and rotate therewith;
- a head portion attached to said body, said head having friction surfaces thereon, said friction surfaces positioned so as to allow engagement of said surfaces by brake pads located on and actuated by said caliper, said friction surfaces being coated with a wear resistant material including about 30 to 70 percent by volume of a ceramic particulate material and about 30 to 70 percent by volume of a binder metal compatible with the ceramic particles and the rotor, said rotor having a layer of said binder metal free of ceramic particles disposed between the rotor and the wear resistant material, said binder metal being a nickel based alloy containing about 60-80 weight percent nickel, 15-25 weight percent chromium and 5-10 weight percent aluminum.

* * * * *